(12) United States Patent
Zak et al.

(10) Patent No.: US 9,363,952 B2
(45) Date of Patent: Jun. 14, 2016

(54) HANGABLE CONTAINER

(71) Applicant: KETER PLASTIC LTD., Herzelyia (IL)

(72) Inventors: Zvi Zak, Herzliya (IL); Reut Itzhak-Sigron, Ein Sarid (IL); Alon Blumenzweig, Tel Aviv (IL); Ron Eyal, Jerusalem (IL); Ayala Bougay, Kefar Veradim (IL); Nathalie Toledan-Oved, Tel Aviv (IL)

(73) Assignee: KETER PLASTIC LTD., Herzelyia (IL)

( * ) Notice: Subject to any disclaimer, the term of this patent is extended or adjusted under 35 U.S.C. 154(b) by 0 days.

(21) Appl. No.: 14/397,306

(22) PCT Filed: Apr. 11, 2013

(86) PCT No.: PCT/IL2013/050320
§ 371 (c)(1),
(2) Date: Oct. 27, 2014

(87) PCT Pub. No.: WO2013/160889
PCT Pub. Date: Oct. 31, 2013

(65) Prior Publication Data
US 2015/0114865 A1    Apr. 30, 2015

Related U.S. Application Data

(60) Provisional application No. 61/638,511, filed on Apr. 26, 2012.

(51) Int. Cl.
*A01G 9/02* (2006.01)
*A47G 7/04* (2006.01)
(Continued)

(52) U.S. Cl.
CPC ............... *A01G 9/024* (2013.01); *A01G 9/023* (2013.01); *A47G 7/044* (2013.01);
(Continued)

(58) Field of Classification Search
USPC ................ 206/520, 506, 423, 515; 47/67, 83; D11/148
See application file for complete search history.

(56) References Cited

U.S. PATENT DOCUMENTS 4,102,081 A  *  7/1978  Morrow .......................... 47/67
4,170,089 A  * 10/1979  Smrt ............................... 47/67
(Continued)

FOREIGN PATENT DOCUMENTS

BE          1017625 A3    2/2009
DE    20 2010 007 311 U1   1/2011
(Continued)

OTHER PUBLICATIONS

"Two Tier Dual Metal Plant Hanger from Collections Etc." 1 page, accessed on Mar. 7, 2012, available online at: http://www.collectionsetc.com/Product/two-tier-dual-metal-plant-hanger.aspx.
(Continued)

*Primary Examiner* — Jeffrey Allen
*Assistant Examiner* — Jennifer Castriotta
(74) *Attorney, Agent, or Firm* — Vorys, Sater, Seymour & Pease LLP

(57) ABSTRACT

Provided is a hangable container including a shell with a bottom portion and a top rim spaced from the bottom portion, the shell having an inner and an outer surface and defining a basin of the container. The container also including a hollow stem extending from the inner surface of the shell and having a first end associated with the bottom portion and a second, free end, remote from the bottom portion formed with an articulation member; and a catch provided at an inner portion of the hollow stem adjacent the first end, the catch being configured for engagement with an articulation member of a corresponding container.

14 Claims, 12 Drawing Sheets

(51) Int. Cl.
*B65D 21/02* (2006.01)
*B65D 21/06* (2006.01)

(52) U.S. Cl.
CPC ....... *B65D 21/0212* (2013.01); *B65D 21/0216* (2013.01); *B65D 21/0233* (2013.01); *B65D 21/0238* (2013.01); *B65D 21/062* (2013.01)

(56) References Cited

U.S. PATENT DOCUMENTS

| | | | |
|---|---|---|---|
| 4,227,343 A | | 10/1980 | Espy et al. |
| 4,635,394 A | * | 1/1987 | Brown ................................ 47/67 |
| 4,912,875 A | * | 4/1990 | Tardif ................................ 47/71 |
| 5,052,148 A | * | 10/1991 | Sharon et al. ...................... 47/67 |
| 5,077,936 A | * | 1/1992 | Beaven ............................... 47/67 |
| 5,727,347 A | | 3/1998 | Sellers |
| 5,743,044 A | | 4/1998 | Hopkins |
| 6,381,900 B1 | | 5/2002 | Crowley |
| 7,861,888 B2 | * | 1/2011 | Niedzwiecki ................. 220/703 |
| 8,123,187 B2 | | 2/2012 | Vosbikian et al. |
| D693,730 S | | 11/2013 | Zak et al. |

FOREIGN PATENT DOCUMENTS

| | | | | |
|---|---|---|---|---|
| EP | 1 166 690 A2 | | 1/2002 | |
| EP | 1166690 | * | 1/2002 | ............... A47G 7/04 |
| FR | 2 766 685 A1 | | 2/1999 | |
| GB | 1 267 541 A | | 3/1972 | |
| GB | 2 135 876 A | | 9/1984 | |
| JP | 8-66124 A | | 3/1996 | |

OTHER PUBLICATIONS

"Amazon.com Houston Assorted Enamel Triple Hanging Planter: Patio, Lawn & Garden" 2 pages, accessed on Mar. 7, 2012, available online at: http://www.amazon.com/HOUSTON-Assorted-Enamel-Hanging-Planter/ . . . .

* cited by examiner

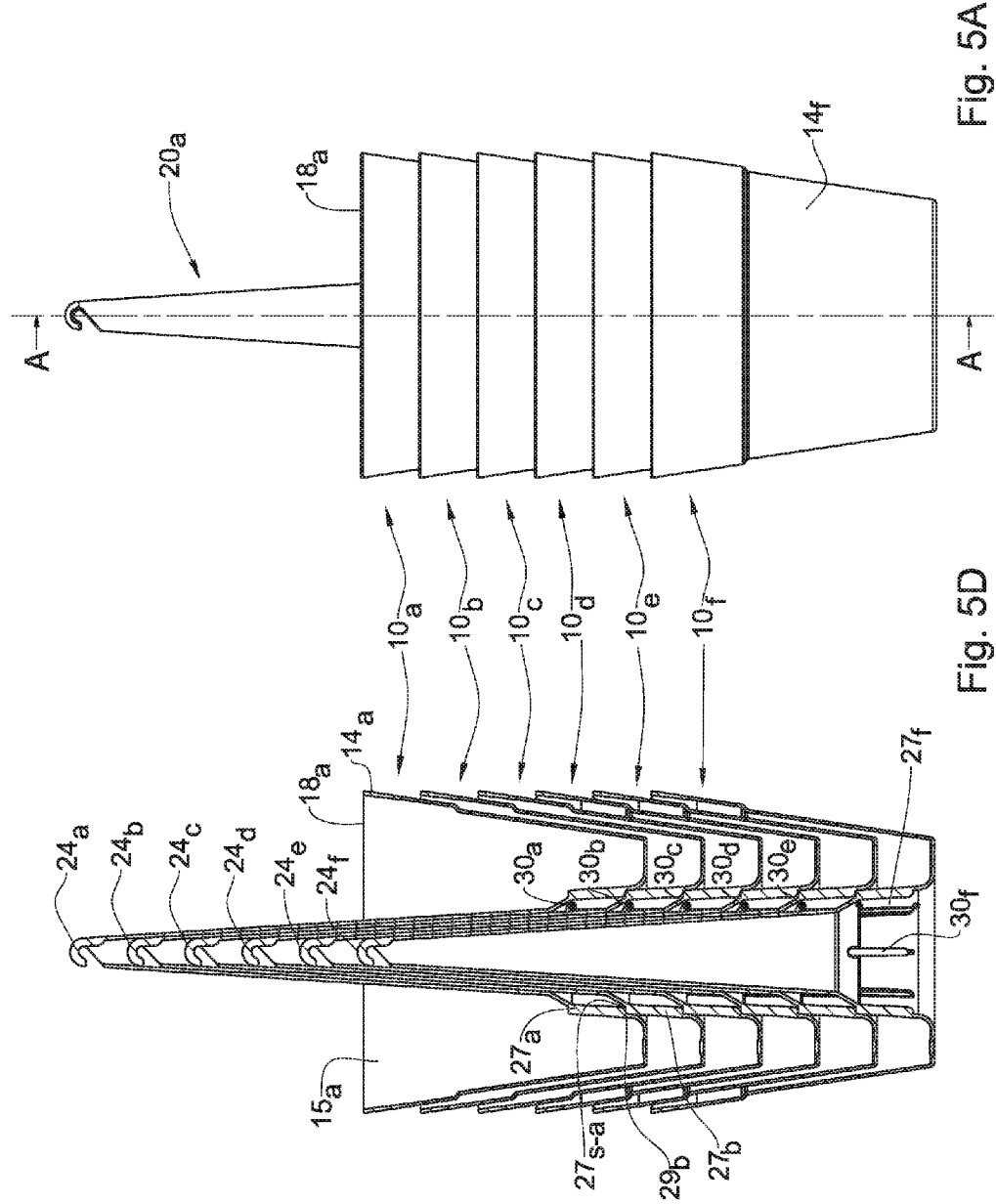

HANGABLE CONTAINER

FIELD

This disclosed subject matter relates to containers, in particular containers such as flower-pots, plant containers etc., in particular, those configured for being suspended.

BACKGROUND

Flower-pots are used for growing plants/flowers therein, and are configured for containing therein a substrate such as soil for the plants/flower to be planted in and grow from.

Some flower-pots are configured for being positioned on a surface (e.g. floor, ground etc.) while other flower-pots are configured for being hanged so that a bottom surface of the pot is suspended in the air.

For this purpose, flower-pots are usually provided with suspension elements such as strings, ropes, rigid or flexible extensions etc. extending over a top rim of the flower-pot, and articulated to articulation membering means configured for attachment to an anchor point.

For example, a flower-pot can be provided with three strings, the first end of each string being attached a top rim of the flower-pot while the second ends of the strings are catched by a articulation member configured for being articulation membered on an anchor point affixed to the ceiling, window sill etc.

GENERAL DESCRIPTION

According to one aspect of the disclosed subject matter there is provided a hangable container comprising:
- a shell with a bottom portion and a top rim spaced from the bottom portion, the shell having an inner and an outer surface and defining a basin of the container;
- a hollow stem extending from the inner surface of the shell having a first end associated with the bottom portion and a second, free end remote from the bottom portion formed with an articulation member; and
- a catch provided at a portion of the hollow stem adjacent said first end, said catch being configured for engagement with an articulation member of a corresponding container;
- wherein an inscribing circle of the bottom portion is of smaller diameter than an inscribing circle of the top rim, and an inscribing circle of the first end of the hollow stem is of greater diameter than an inscribing circle of the second, free end of the hollow stem, thereby allowing the container to be both nestable and stackable with similar containers.

The hollow stem can thus be of tapering shape allowing nesting of the hollow stem within the hollow of a stem of a subsequent container. However, it should be appreciated that the stem is not limited to a conical shape (i.e. of a circular cross section taken perpendicular to a central axis of the stem) and can be of various geometries, for example polygonal (triangle, rectangle, a combined polygon etc.) or a curved contour.

It should also be noted that according to some examples, the cross-sectional contour of the hollow stem can be an open contour.

According to another aspect of the disclosed subject matter, there is provided a hangable container system comprising two or more containers of the previous aspect of the disclosed subject matter, the containers being consecutively engaged with one another so that the articulation member of one container is articulated to a catch of a consecutive container.

In connection with the above, the container can be used, for example, as a flowerpot wherein it is configured for containing soil and irrigation fluid and growing plants therein.

The arrangement can be such that a plurality of similar flower-pots are configured for successive engagement with one another, wherein the articulation member of one flower-pot is articulated to the catch of the successive flower-pot and so on, forming a flower-pot chain.

The shell can be formed with a side portion extending transverse to the bottom portion, the end of which is defined by said rim.

The shell and the stem can be integrally formed with one another. Alternatively, the inner surface of the shell and the stem can be provided with corresponding engagement arrangement allowing the stem to be articulated to the inner surface. In addition, the stem can either be provided with a separate articulation member configured for attachment thereto or be integrally formed with the articulation member.

According to a particular example, the entire flower-pot can be a uniform injection molding article, wherein an external surface of the stem is continuous with the inner surface of the shell and an internal surface of the stem is continuous with the external surface of the shell. In this case, an auxiliary rim can be defined between the hollow of the stem and the outer surface of the bottom portion of the shell, defining an opening of the hollow.

The arrangement can be such that, during stacking and nesting, the hollow of the stem is configured for accommodating, at least partially, the stem of a corresponding flower-pot. Thus, the flower-pot system can be configured for assuming at least the following extreme positions:
- first, fully deployed position in which the articulation member of each flower-pot (except for the first in the chain) is articulated to the catch of the corresponding successive flower-pot; and
- second, fully nested position in which the stem of each flower-pot (except for the first in the chain) is accommodated within the hollow of the stem of the corresponding successive flower-pot.

It is appreciated that the flower-pot system can be configured for assuming a plurality of intermediate positions in which some of the articulation members are articulated to their corresponding catches and some of the stems are accommodated within the hollow of another stem of the corresponding flower-pot.

The flower-pot can be formed with a plurality of support ribs disposed on the outer side of the shell at a bottom opening of the hollow stem. The support ribs can extend along the central axis of the flower-pot, each support rib having a bottom abutment surface.

In addition, the flower-pot can be formed, on an inner side of the shell, with an abutment step (flange) configured for engagement with the abutment surface of a support rib of a subsequent flower-pot.

Specifically, when two flower-pots are in a second, fully nested position, the arrangement is such that the bottom abutment surface of the upper flower-pot of the two abuts the abutment step of the lower flower-pot.

The abutment step and the ribs are designed such that when abutting each other, no surface contact takes place between the external surface of the hollow stem of the bottom flower-pot and the inner surface of the hollow stem of the top flower-pot. This allows preventing friction between the stems, and thereby avoiding friction-locking between two subsequent flower-pots.

In addition, the above arrangement allows supporting a considerable amount of weight using the ribs and the step.

The catch can be displaceable between a first, operational position in which it is configured for engagement with a corresponding articulation member of a stem and a second, non-operational position. The catch can further assume a plurality of intermediate positions between the first, operational position and the second, non-operational position. However, it should be understood that each of said intermediary positions can also serve as an operational position of the catch, i.e. it can be configured for attachment thereto of the articulation member.

Displacement between the above position can be provided via a pivotal articulation of the catch to the shell. Specifically, the shell can be provided with pivot holes (through going or not) configured for receiving therein corresponding ends of the catch.

It is appreciated that the pivot holes accommodating the catch are of slightly greater cross-sectional area, whereby the catch is free to pivot within the hole. In addition, the larger holes also provide for drainage of excess fluids contained within the basin.

The shape of the catch can be such that, when in the second, non-operational position, it does not obstruct the hollow of the stem, thereby allowing stacking and nesting of successive flower-pots, i.e. allowing a stem of a successive flower-pot to be introduced into the hollow.

In the second, non-operational position, the catch can be configured for being flush with the inner surface of the hollow stem. Specifically, the catch can have a curved shape extending along a single plane, and in the second, non-operational position, the catch can be configured to be oriented so that the single plane is generally parallel to the outer surface of the bottom portion of the shell.

According to a particular example, the catch can be in the shape of an arc or semi-circle, with the ends thereof being articulated to the shell. Thus, in the first, operational position the catch can be oriented so that the arc/semi-circle extends along a plane transverse to the outer surface of the shell and in said second, non-operational position, to be oriented so that the arc/semi-circle extends along a plane parallel to the outer surface.

According to of the above examples, the hollow of the stem is configured for fully accommodating the catch (e.g. the nominal dimension of the hollow at the articulation area can be of greater nominal dimension than that of the arc/semi-circle of the catch), wherein the catch can be articulated to the inner surface of the stem hollow and be fully accommodated therein the second, non-operational position.

In particular, the arrangement can be such that the catch is articulated to the hollow stem at an articulation point of a distance H from the bottom portion, whereas the distance between the articulation point and a point on the catch most remote therefrom is h<H.

In the second, non-operational position, the shape of the catch conveniently extends along the rim, surrounds the opening of the hollow of the stem and prevents obstructions of the hollow, thereby allowing a stem of a successive flower-pot to be received within the hollow.

According to another design embodiment, the catch can be articulated to the shell at the rim formed between the stem hollow and the outer surface of the shell, wherein in the first, operational position, the catch protrudes from the bottom portion of the shell.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIGS. 5A and 5B are schematic front and side views of the flower-pot system shown in FIG. 4A;

FIGS. 5C and 5D are schematic cross-sectional views of the flower-pot system taken along lines A-A and B-B shown in FIGS. 5A and 5B respectively;

DETAILED DESCRIPTION OF EMBODIMENTS

Figure 1A:
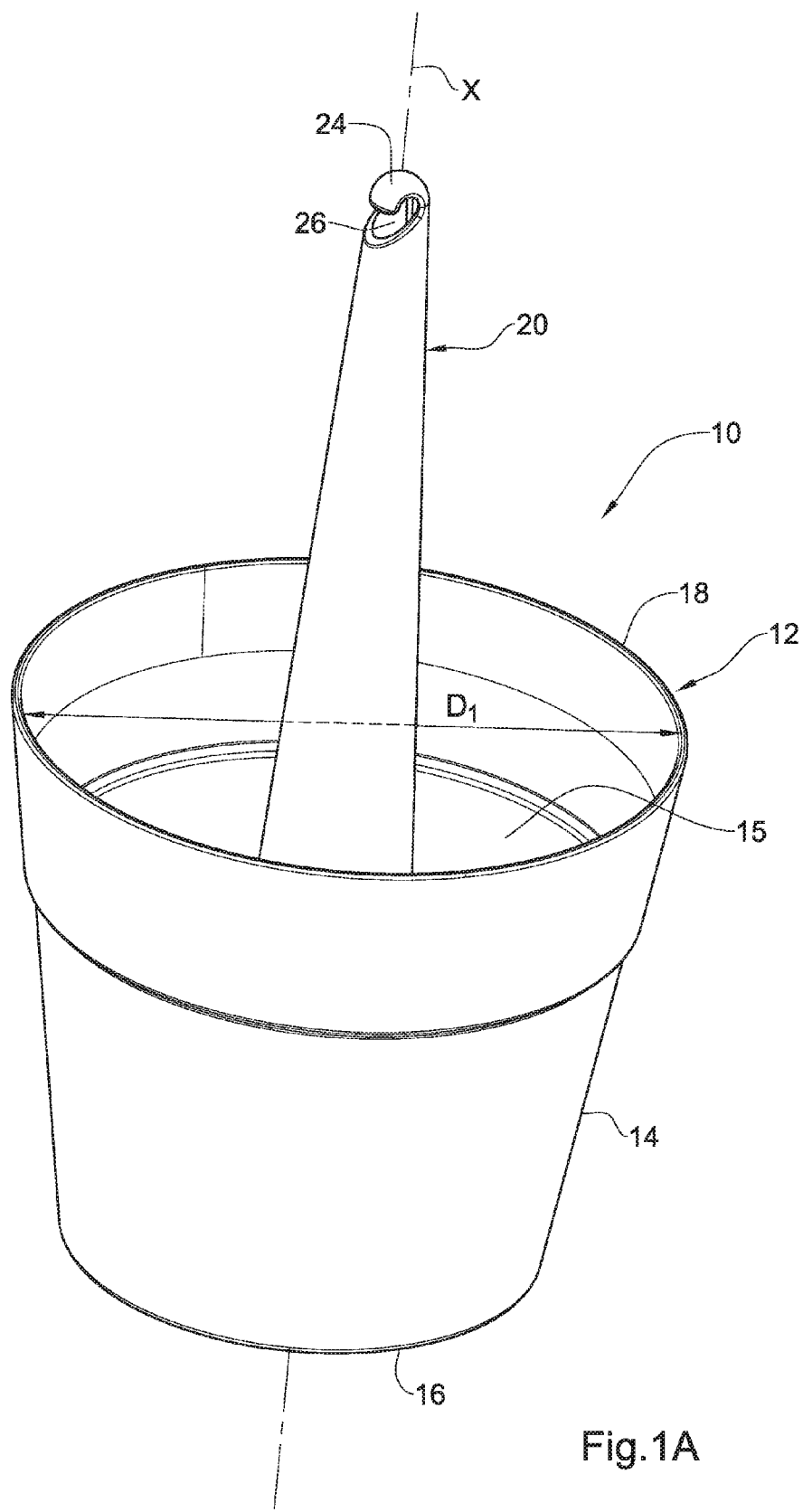
FIGS. 1A to 1C are schematic isometric, bottom and top views of a flower-pot according to the disclosed subject matter.

Reference is first made to FIGS. 1A to 1E in which a flower-pot is shown, generally being designated as 10 and comprising a shell 12 having a bottom portion 16 and a side portion 14 extending transverse thereto. The shell 12 defines a basin 15 of the flower-pot 10, delimited by a top rim 18 of the side shell 14.

The bottom portion 16 of the flower-pot has a nominal dimension $d_1$ whereas the top rim 18 of the flower-pot 10 has a nominal dimension of $D_1 > d_1$. The conical-like shape of the flower-pot 10 allows, inter alia, stacking and nesting of a plurality of flower-pots 10 within one another as will be explained with respect to FIGS. 5A to 5D.

The flower-pot 10 further comprises a hollow stem 20 extending from the bottom portion 16 of the shell 12, integrally formed with the shell 12, the stem having a first end (shown in FIGS. 1B and 1C) adjacent the bottom portion 16 and a free end remote from the bottom portion 16.

The bottom portion 16 of the shell is further formed with pre-perforated apertures 19, mechanically weakened points, which the user can perforate in order to form drainage holes at the bottom portion 16.

It is observed that the free end of the stem 20 projects from the basin 15 and above the level of the top rim 18. The stem 20 is formed with a hook 24 at the free end thereof having a recess 26, and configured for hooking onto a catch (shown in FIGS. 1B to 1D) of a similar flower-pot 10.

Figure 1B:
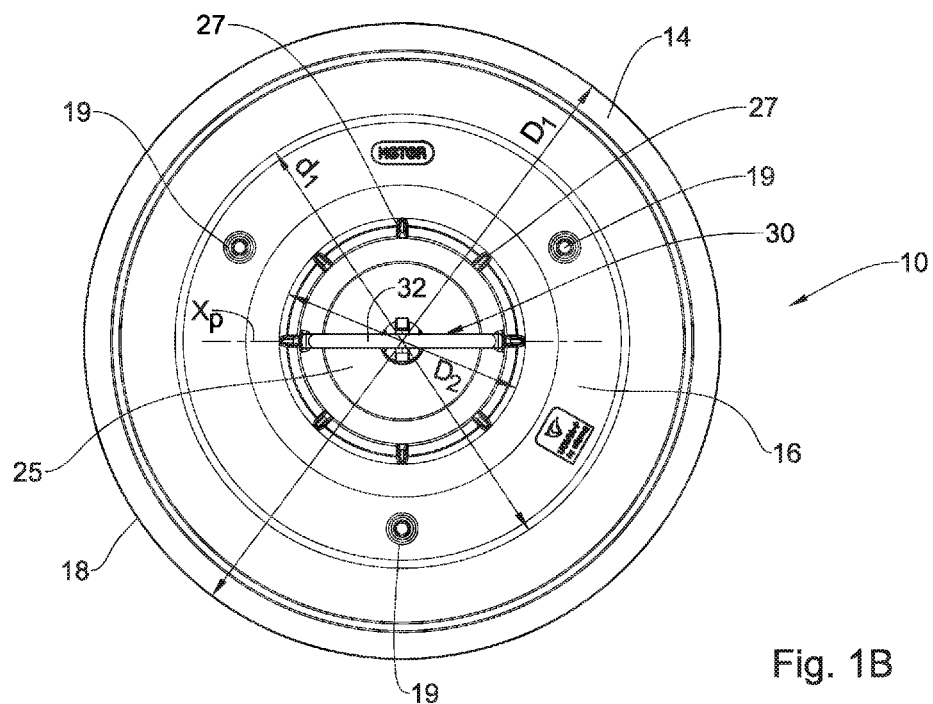
Figure 1C:
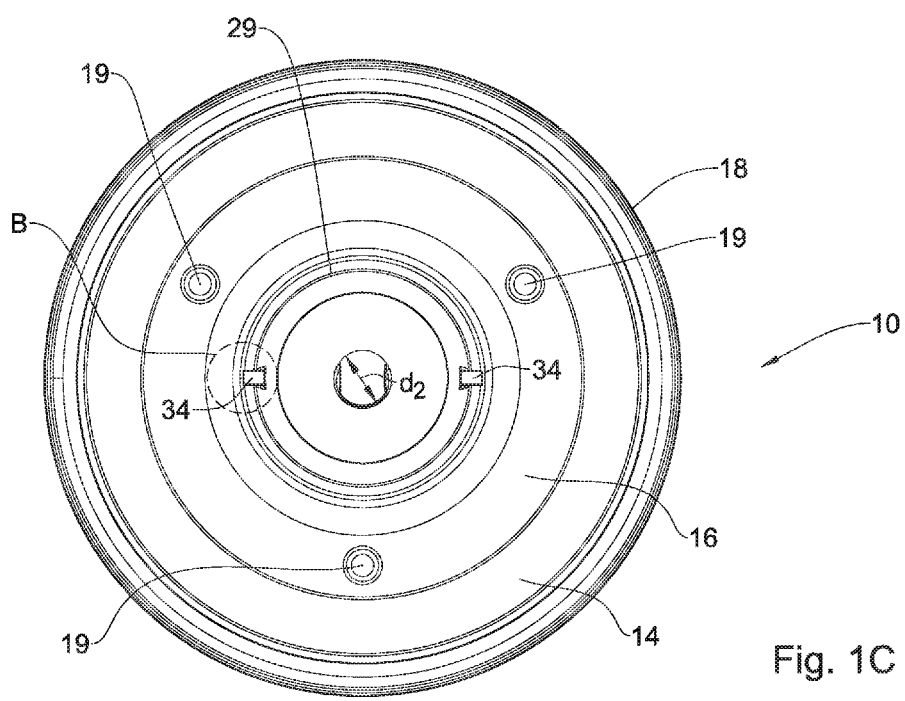
Figure 1D:
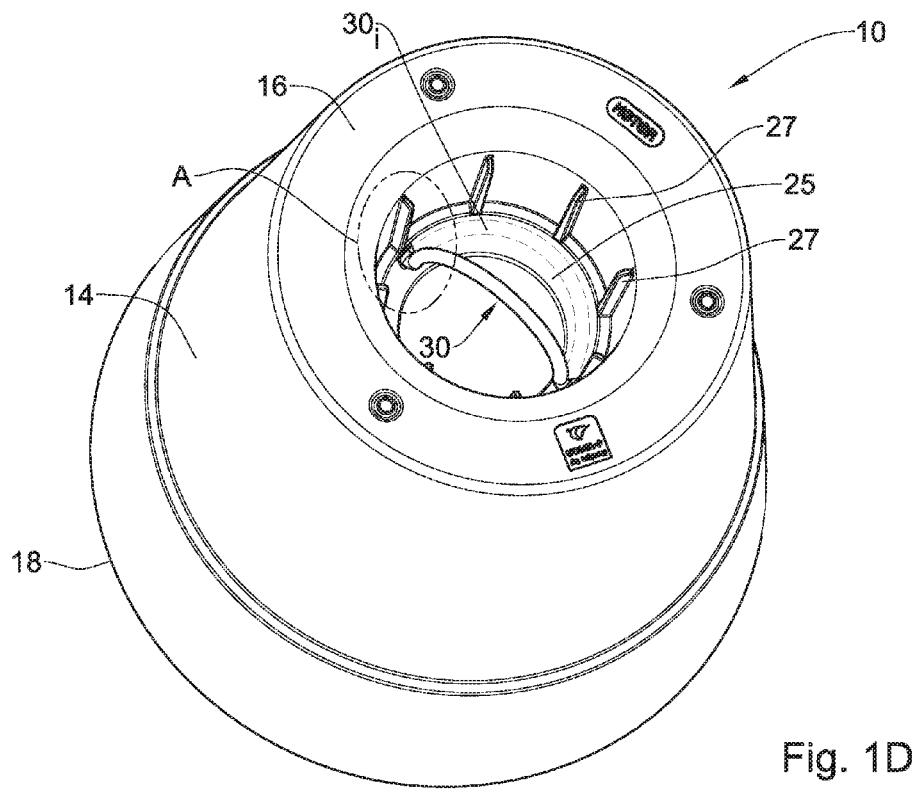
FIG. 1D is a schematic bottom isometric view of the flower-pot shown in FIGS. 1A to 1C.

As the stem 20 is integrally formed with the wall 12, and is hollow within, it is observed from FIG. 1D that an opening is formed at the bottom portion 16 of the wall 12. The hollow 25 is configured for accommodating therein a catch member 30. The catch 30 comprises a grip portion 32 and two pivot portions 34 via which the catch 30 is articulated to the stem 20, allowing it to perform pivotal movement.

Figure 1E:
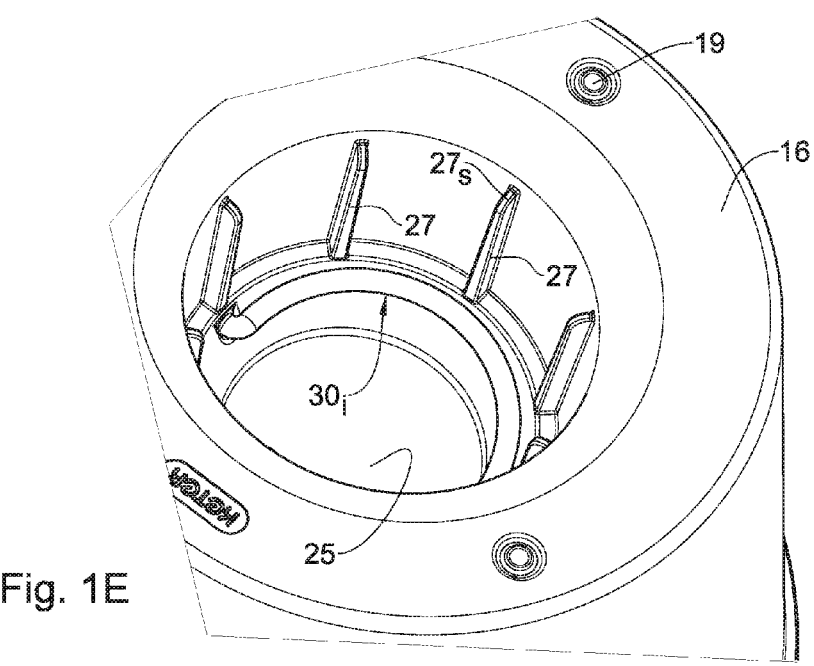
FIG. 1E is a schematic enlarged view of the a portion of the flower-pot shown in FIG. 1D, with the catch at a nesting position thereof.

The pivotal movement allows the catch 30 to assume various angular positions about its pivot axis, including a hanging position as shown in FIG. 1D and FIGS. 4A to 4E, and a nesting position as shown in FIG. 1E (where the catch is designated 30i) and FIGS. 5A to 5D.

As with the flower-pot 10, the stem 20 is also of conical-like shape having a larger diameter $D_2$ at the first end thereof, adjacent the bottom portion 16 and a smaller diameter $d_2$ at the free end, allowing stacking and nesting as will be explained with respect to FIGS. 5A to 5D.

It is further observed from FIGS. 1B and 1C that the flower-pot is formed with support ribs 27 (see also FIGS. 4D and 4E) and an abutment step 29, the purpose of which will be later explained in detail with reference to FIGS. 5A to 5D.

Figure 2A:
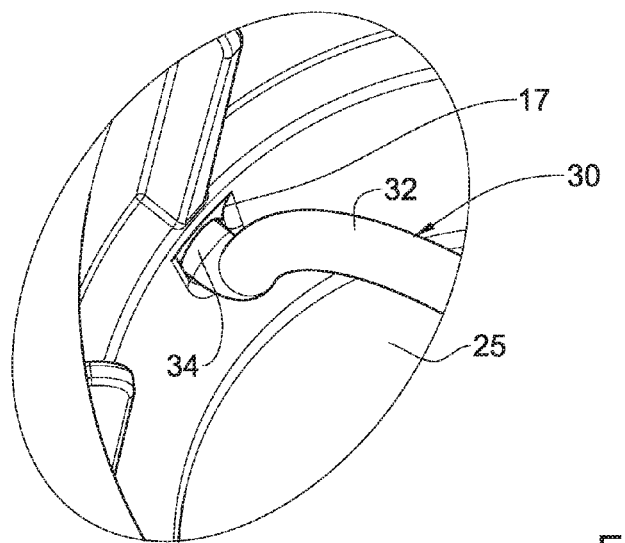
FIG. 2A is a schematic enlarged view of detail A shown in FIG. 1D.
Figure 2B:
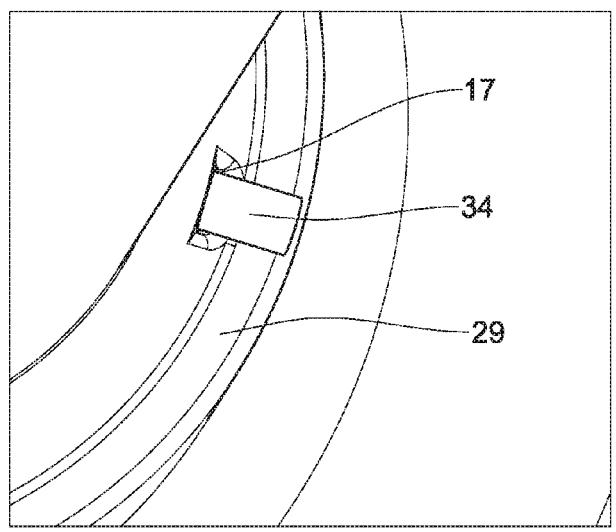
FIG. 2B is a schematic isometric enlarged view of detail B shown in FIG. 1C.
Figure 3A:
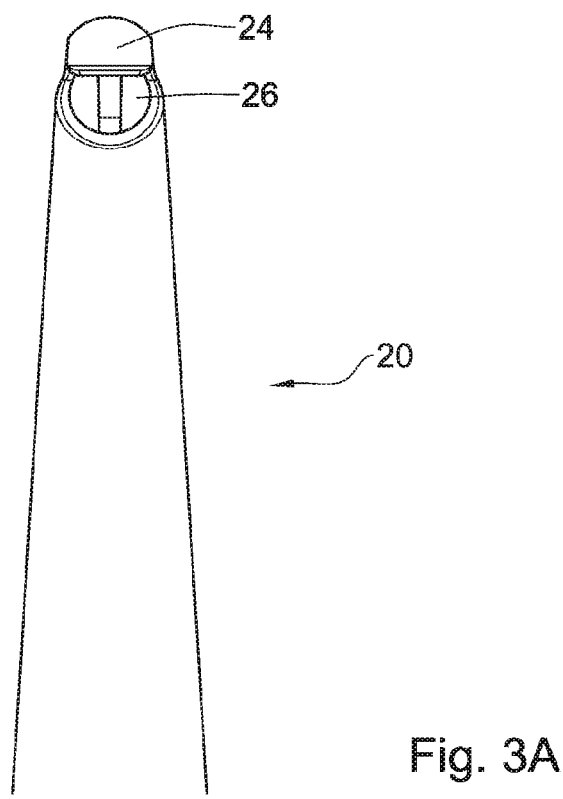
FIGS. 3A and 3B are schematic front and side views of a stem of the flower-pot shown in FIGS. 1A to 1D.
Figure 3B:
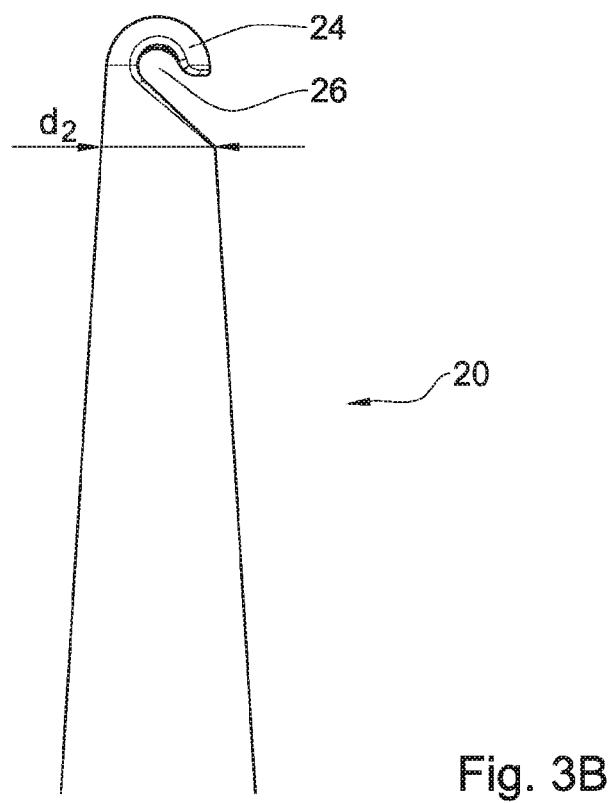

Turning now to FIGS. 2A and 2B, the catch 30 is shown in the form of a semi-circle 32. Due to the pivotal articulation to the hollow stem via recesses 17, the catch is configured for assuming various angular positions about the pivot axis $X_P$ (shown in FIG. 1B).

Turning now to FIGS. 4A to 4E, a flower-pot system is shown generally designated as 1 and comprising six flower-pots 10a to 10f consecutively attached to one another.

It is observed that in the position shown above, each flower-pot is suspended from the flower-pot positioned consecutively above it, specifically, the hook 24 of each flower-pot is grasping the catch 30 of the corresponding flower-pot above it. In particular, the hook 24d of flower-pot 10d is hooked on the catch 30c of the flower-pot 10c, the hook 24c of flower-pot 10c is hooked on the catch 30b of the flower-pot 10b and the hook 24b of flower-pot 10b and so forth.

It is appreciated that the hook 24a of flower-pot 10a is not engaged with any catch 30 (since there is no flower-pot above it) and the catch 30f of flower-pot 10f is also not grasped by any hook 24 since there is not flower-pot 10 below it.

In the position shown above, the entire system 1 can be suspended from an appropriate anchoring point (not shown) to which the hook 24a of flower-pot 10a can be articulated.

Figure 4A:
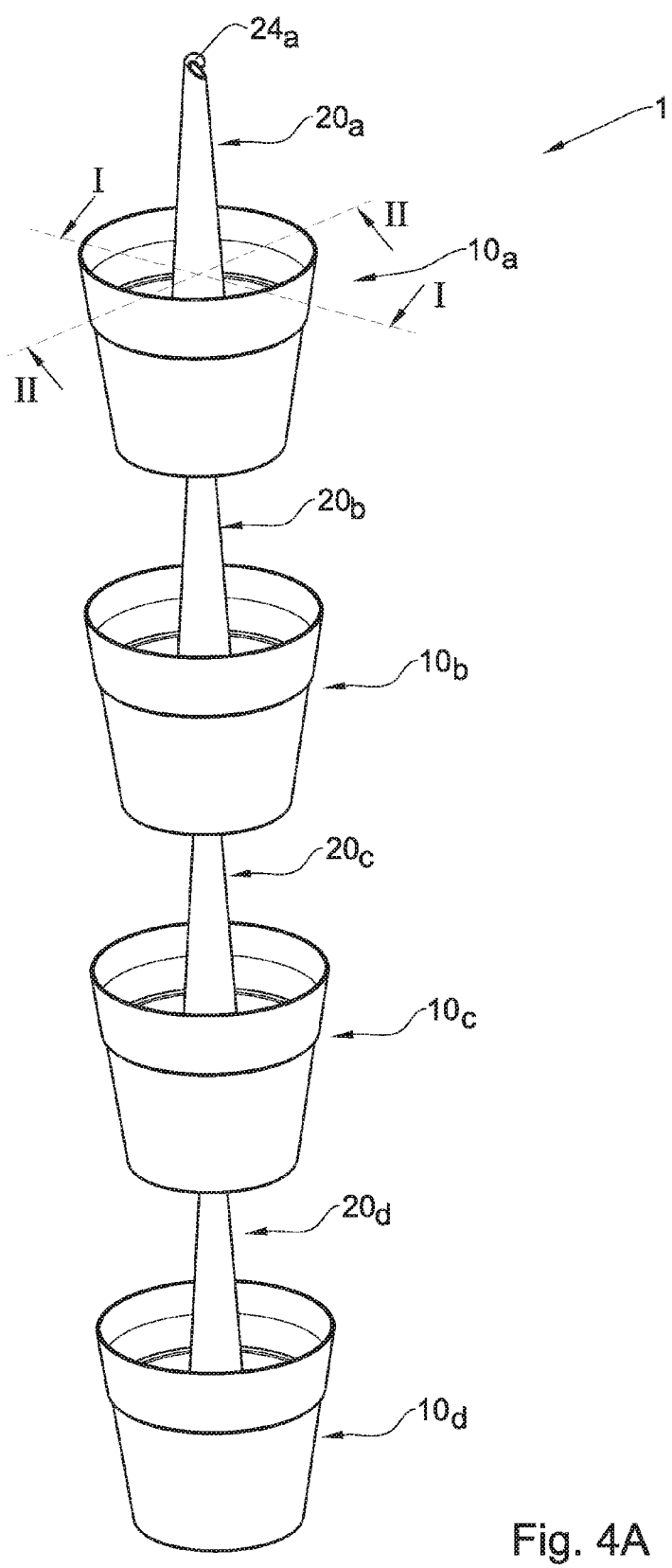
FIG. 4A is a schematic isometric view of a flower-pot system comprising a plurality of flower-pots shown in FIGS. 1A to 1D.
Figure 4B:
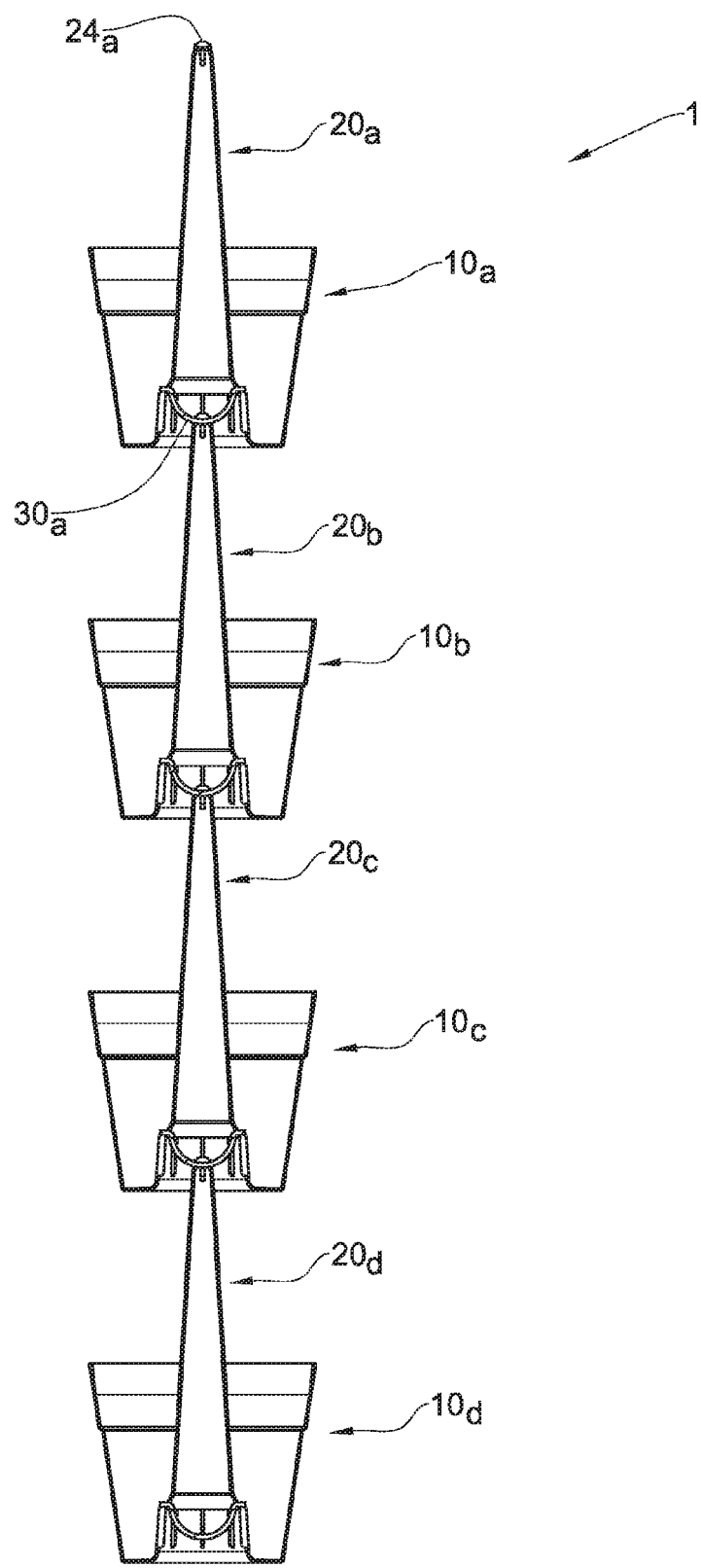
FIGS. 4B and 4C are schematic cross-sectional views taken along lines I-I and II-II shown in FIG. 4A respectively.
Figure 4C:
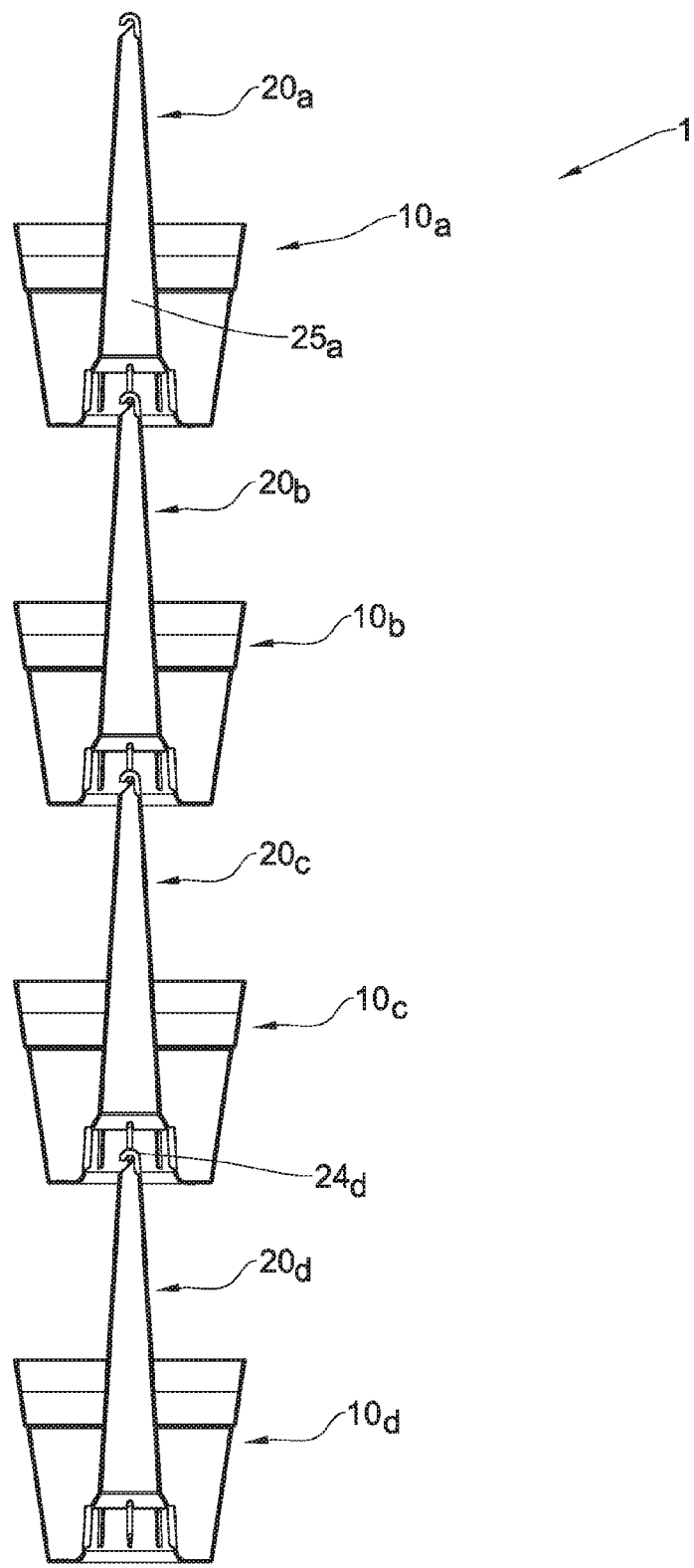
Figure 4D:
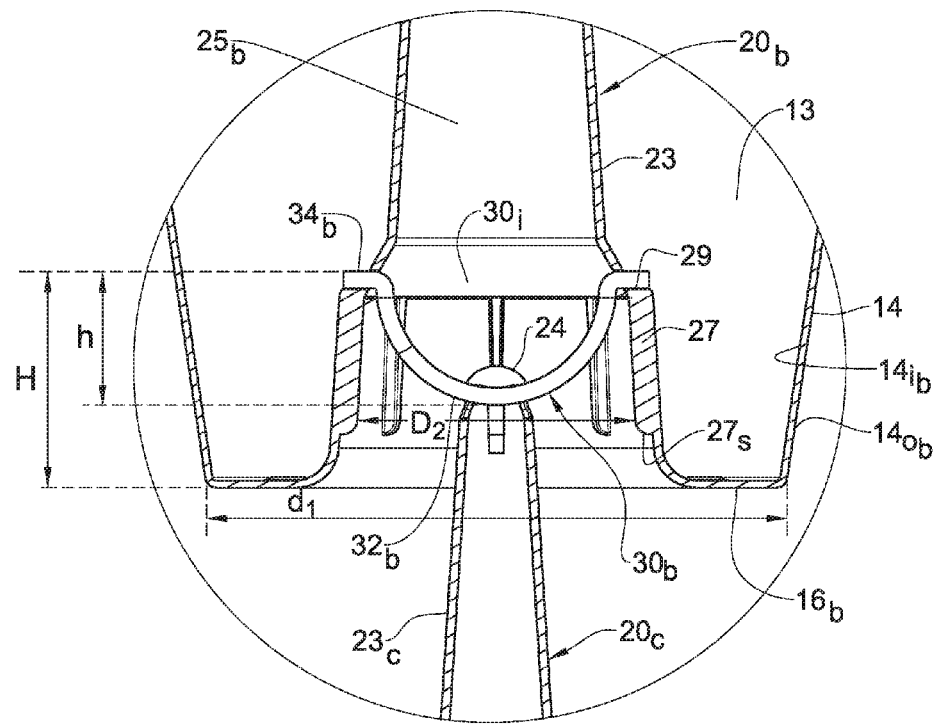
FIGS. 4D and 4E are schematic enlarged views of details C and D shown in FIGS. 4B and 4C respectively.
Figure 4E:
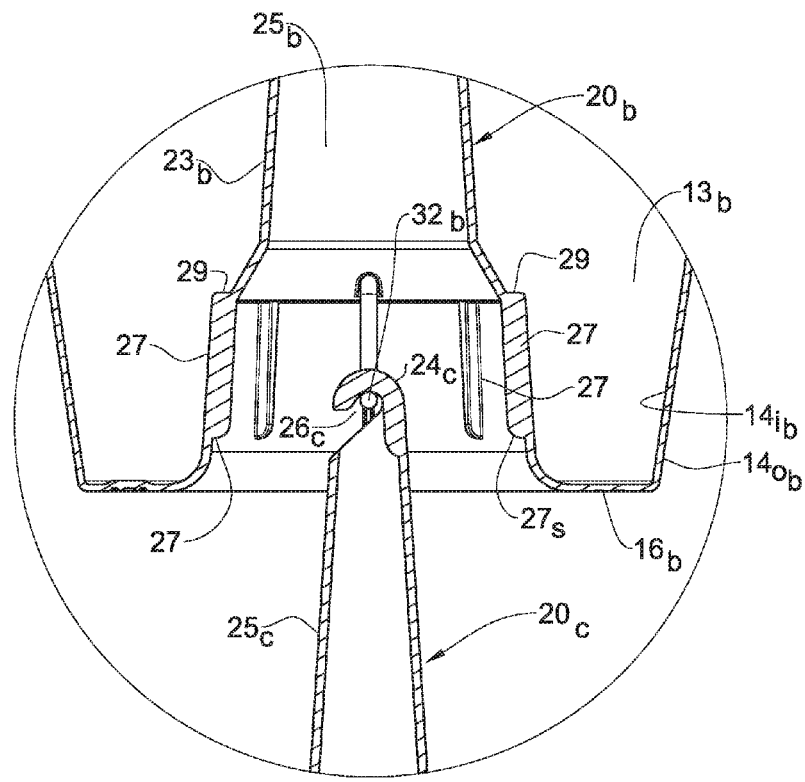
Figure 5B:
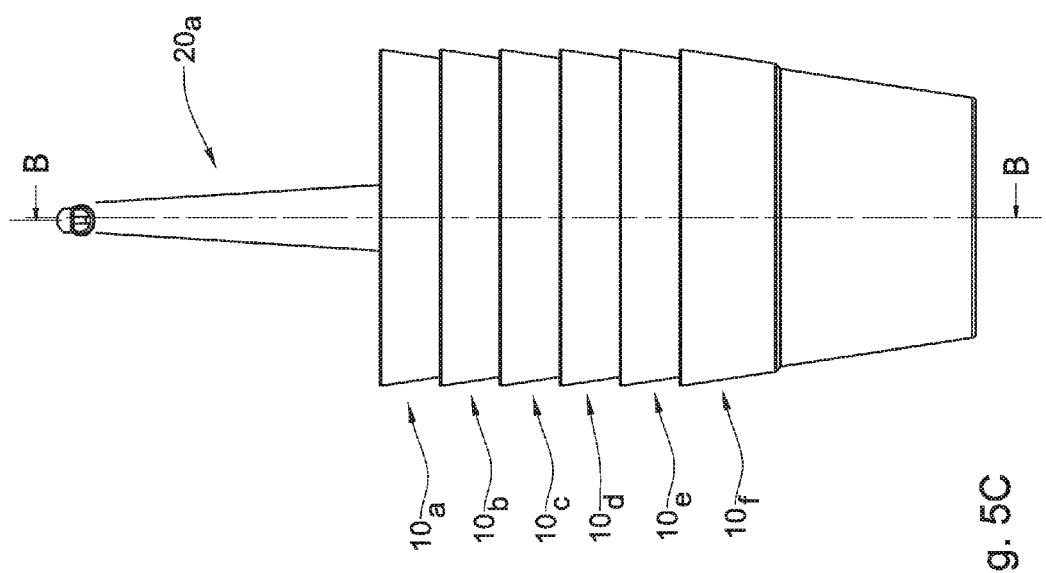
Figure 5C:
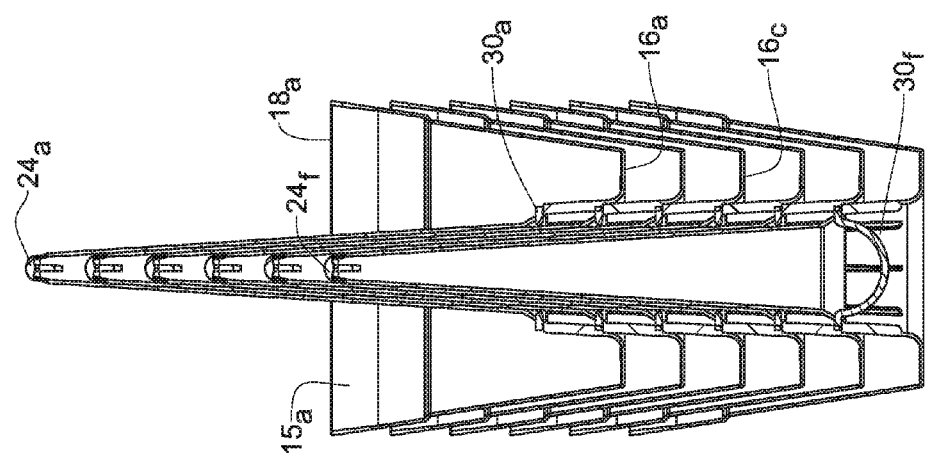

With particular reference to FIGS. 4D and 4E, it is observed that the catch 30 is fully accommodated within the hollow of the stem 20. This is made possible by the design under which the depth H of the articulation of the catch 30 is greater than the axial extension h of the catch 30 in its vertical position.

It is also noted that even in the position shown above (a fully deployed position), the free end of the stem 20 of each flower-pot 10 (except for 10a) is received within the hollow 25 of the consecutive stem 20.

This arrangement allows, inter alia, to protect the articulation area between two consecutive flower-pots 10, making the entire system 1 more durable to external damage and conditions.

In addition, with reference to FIGS. 4D and 4E, it is observed that the bottom opening of the hollow stem 20 is provided with support ribs 27 extending along the central axis X and having a bottom abutment surface $27_S$. In addition, the shell is formed on an inner side thereof with an abutment step 29.

The arrangement is such that when two flower-pots are nested within one another, the lower abutment surface $27_S$ abuts the abutment step 29 of the subsequent flower-pot 10.

Attention is now drawn to FIGS. 5A to 5D, in which the system 1 is shown in its nesting position, i.e. the four flower-pots 10a to 10d are received within one another when stacked.

It is observed that the basin of one flower-pot, e.g. 10b is configured for almost fully accommodating the shell 12a of the flower-pot 10a, disposed directly above it, while the hollow stem 20b is configured for almost fully receiving therein the stem 20c of the flower-pot 10c disposed directly below it.

In the position shown above, the catch 30 of each flower-pot 10 assumes a retracted position in which it is flush with inner surface of the hollow 25 of the stem 20. Due to the semi-circular shape of the catch 30, in its retracted position it does not obscure the opening of the hollow stem 20, allowing the successive hollow stem 20 to be received therein.

It is also noted that in the stacked position, two subsequent stems do not come into surface contact with one another, thereby preventing friction-locking therebetween. Surface contact is prevented via the support ribs 27, since the arrangement is such that the abutment between the support ribs 27 and the abutment step 29 does not allow the hollow stem 20 to fully rest on the stem accommodated therein.

Figure 6:
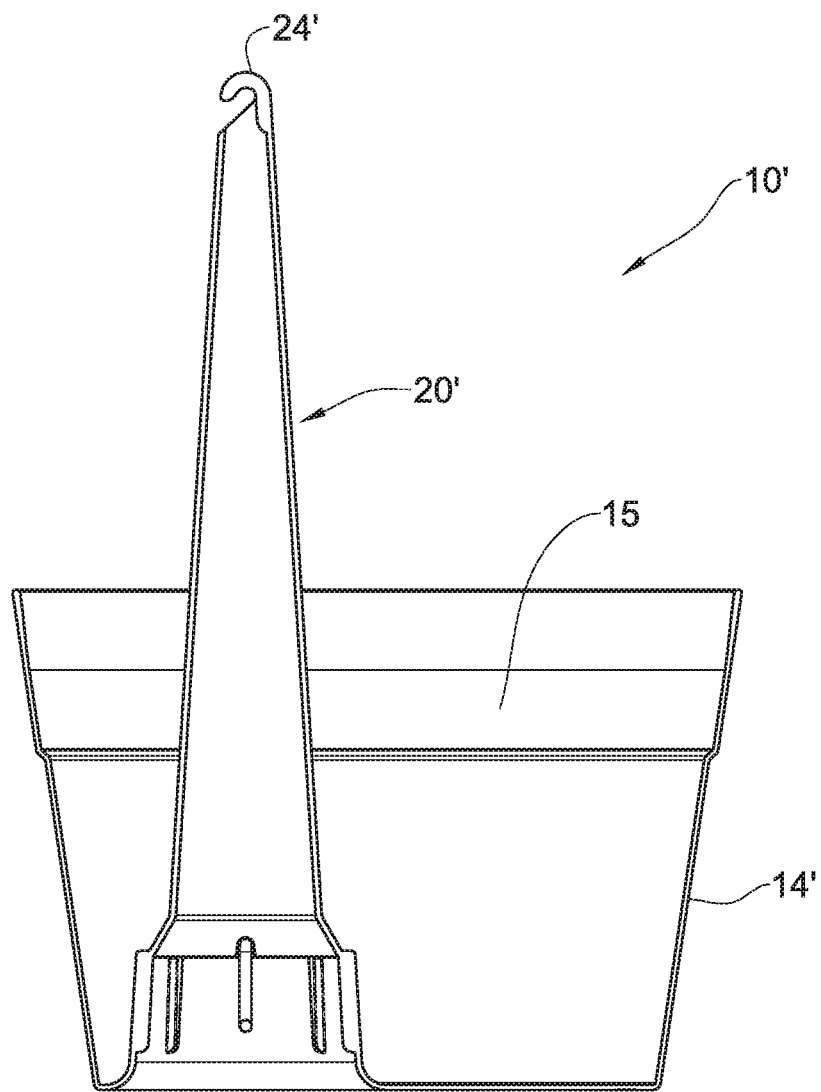
FIG. 6 is a schematic cross-sectional view of another example of a flower-pot according to the disclosed subject matter.

Turning now to FIG. 6, another example of a flower-pot is shown, generally designated as 10'. The difference between the flower-pot 10' and the previously described flower-pot 10 lies in the position of the stem 20' with respect to the basin 15.

In particular, in the flower-pot 10', the stem 20' is not coaxial with the basin 15, but rather is disposed adjacent the side wall 14' of the shell 12. Under this design, when suspending consecutive flower-pots 10', the center of gravity of the pots is offset, giving rise to a tilted flower-pot system.

It is appreciated that in the arrangement shown in FIG. 6, the stem is located to the left of the shell 12, and the hook 24' faces to the left. However, it is appreciated that the direction of the hook 24 and the location of the stem 20 can vary, so that the center of gravity also varies.

Specifically, if the stem is offset in a first offset direction towards the shell, the hook 24 can face a direction which is offset angularly by N degrees with respect to the first offset direction. Using various flower-pots with various offsets can provide an array of flower-pot systems, each leaning in a different direction due to the variation in the center of gravity.

Those skilled in the art to which this invention pertains will readily appreciate that numerous changes, variations, and modification can be made without departing from the scope of the invention, mutatis mutandis.

The invention claimed is:
1. A hangable container, comprising:
a shell with a bottom portion and a top rim spaced from the bottom portion, the shell having an inner and an outer surface and defining a basin of the container;
a hollow stem extending upwards from the inner surface of the shell and having a first end associated with the bottom portion and a second, free end, remote from the bottom portion, and formed with an articulation member; and
a catch provided at an inner portion of the hollow stem adjacent said first end, said catch being configured for engagement with an articulation member of a corresponding container,
wherein an inscribing circle of the bottom portion is of smaller diameter than an inscribing circle of the top rim, and an inscribing circle of the first end of the hollow stem is of greater diameter than an inscribing circle of the second, free end of the hollow stem, thereby allowing the container to be both nestable and stackable with similar containers,
wherein the catch is displaceable between a first, operational position in which it is configured for engagement with a corresponding articulation member of a stem and a second, non-operational position in which it is configured to be displaced so as to allow nestable stacking with the similar container, and wherein displacement between the first position and the second position is provided via a pivotal articulation of the catch to the shell.

2. The container according to claim 1, wherein the articulation member of one container is articulated to the catch of the successive container, forming a container chain.

3. The container according to claim 1, wherein the shell is formed with a side portion extending transverse to the bottom portion, the end of which is defined by said rim.

4. The container according to claim 1, wherein the shell and the stem are integrally formed with one another.

5. The container according to claim 1, wherein the stem is integrally formed with the articulation member.

6. The container according to claim 1, wherein the entire container is a uniform injection molded article.

7. The container according to claim 1, wherein during the nesting and the stacking the container system is configured for assuming at least the following extreme positions,
   first a fully deployed position in which the articulation member of each container is articulated to the catch of the corresponding successive container, and
   second a fully nested position in which the stem of each container is accommodated within the hollow of the stem of the corresponding successive container.

8. The container according to claim 1, wherein the shape of the catch is such that, when in the second, non-operational position, it does not obstruct the hollow of the stem, thereby allowing stacking and nesting of successive containers.

9. The container according to claim 1, wherein in the second, non-operational position, the catch is configured for being flush with the inner surface of the hollow stem.

10. The container according to claim 1, wherein the catch has a curved shape extending along a single plane, and in the second, non-operational position, the catch is configured to be oriented so that the single plane is generally parallel to the outer surface of the bottom portion of the shell.

11. The container according to claim 10, wherein the catch is in the shape of an arc or semi-circle, with the ends thereof being articulated to the shell.

12. The container according to claim 1, wherein the catch is articulated to the hollow stem at an articulation point of a distance H from the bottom portion, whereas the distance between the articulation point and a point on the catch most remote therefrom is h, wherein h <H.

13. The container according to claim 1, wherein the container is formed with at least one support rib disposed on the outer side of the shell at a bottom opening of the hollow stem, said support rib having a bottom abutment surface, said container being further formed, on an inner side of the shell, with an abutment step configured for engagement with the abutment surface of a support rib of an additional hangable container.

14. The container according to claim 13, wherein, when the hangable container is nested in the additional hangable container in a second, fully nested position, the arrangement is such that the bottom abutment surface of the hangable container abuts an abutment step of the additional hangable container.

* * * * *